United States Patent [19]
Woodfill

[11] 3,748,838
[45] July 31, 1973

[54] NUT HARVESTING APPARATUS
[75] Inventor: Larry R. Woodfill, Tulare, Calif.
[73] Assignee: The Raymond Lee Organization, Inc., New York, N.Y.
[22] Filed: July 7, 1972
[21] Appl. No.: 269,761

[52] U.S. Cl. .................. 56/328, 171/58, 294/19 A, 214/356
[51] Int. Cl. ........................................... A01d 51/00
[58] Field of Search ............................ 56/328, 364; 294/19 A; 214/356; 171/58, 63; 198/210

[56]  References Cited
UNITED STATES PATENTS

| | | | |
|---|---|---|---|
| 2,365,540 | 12/1944 | Fonken | 214/356 |
| 2,539,596 | 1/1951 | Smith | 56/328 R |
| 2,651,902 | 9/1953 | Curry | 198/210 |
| 2,658,637 | 11/1953 | Bailey | 214/356 |
| 2,812,871 | 11/1957 | Woodall | 214/356 |
| 3,175,714 | 3/1965 | Wittek | 214/356 |
| 3,613,341 | 10/1971 | Reeves | 56/328 R |

Primary Examiner—Russell R. Kinsey
Attorney—Daniel Jay Tick

[57] ABSTRACT

Each of a plurality of wheels of resilient material has a deep groove formed in and around its peripheral rim. Each of a plurality of arms is pivotally mounted on a platform and pivotally mounts a corresponding one of the wheels for rotation. A guiding device removes nuts from the grooves of the wheels and directs them to an assembly area, so that when the wheels are rolled along the ground they pick up nuts from the ground and move them by rotating to the removal device which removes the nuts from the grooves and directs them to the assembly area.

5 Claims, 3 Drawing Figures

PATENTED JUL 31 1973   3,748,838

NUT HARVESTING APPARATUS

DESCRIPTION OF THE INVENTION

The present invention relates to nut harvesting apparatus. More particularly, the invention relates to walnut harvesting apparatus.

A vacuum type harvester picks up twigs and other foreign matter in harvesting nuts. A sweeper type harvester picks up branches and places the nuts in rows. Both types of harvester break the nuts and raise dust in operation.

The principal object of the invention is to provide nut harvesting apparatus for harvesting walnuts from the ground with efficiency, effectiveness and reliability and eliminating the breaking of the nuts and the picking up of twigs and similar foreign matter.

An object of the invention is to provide nut harvesting apparatus for harvesting nuts from the ground, which apparatus overcomes the disadvantages of known types of apparatus.

Another object of the invention is to provide nut harvesting apparatus for harvesting nuts from the ground without dust or breakage, which apparatus directs the nuts to an assembly area.

In order that the invention may be readily carried into effect, it will now be described with reference to the accompanying drawing, wherein.

In the FIGS., the same components are identified by the same reference numerals.

Figure 1:
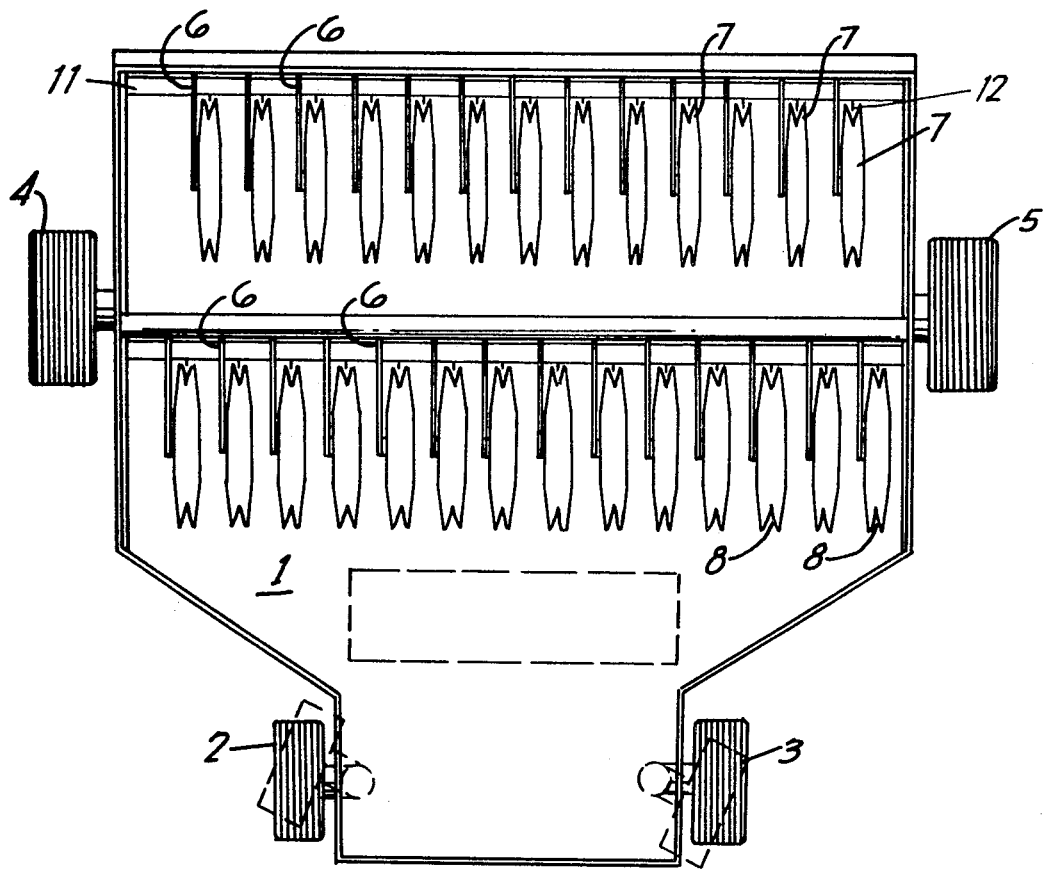
FIG. 1 is a bottom view of an embodiment of the apparatus of the invention for harvesting nuts.
Figures 2, 3:
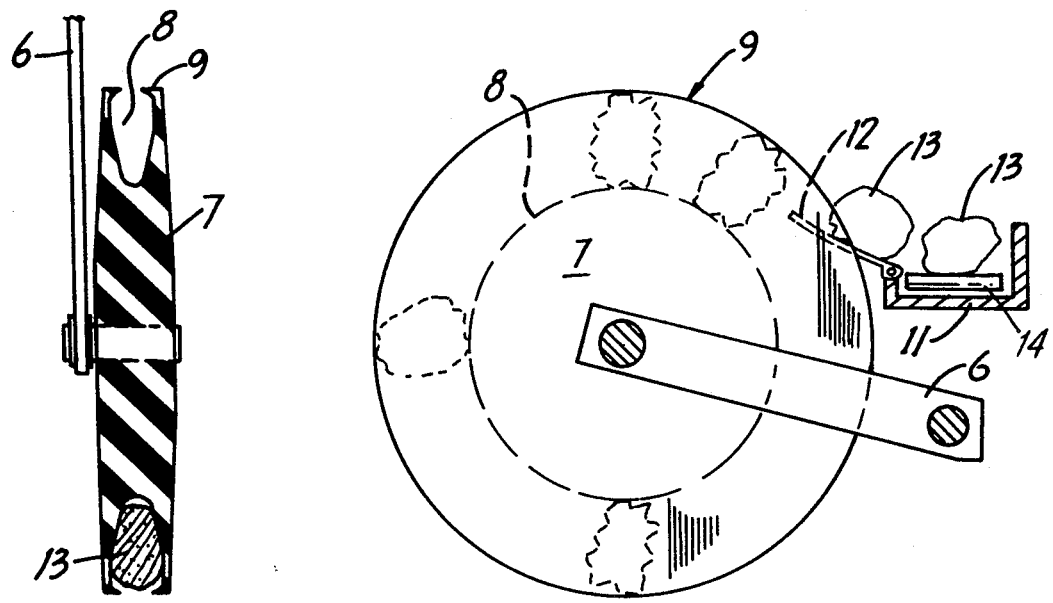
FIG. 2 is a view, on an enlarged scale, partly in section, of a wheel of the nut harvesting apparatus of the invention.
FIG. 3 is a schematic diagram, on an enlarged scale, of a wheel and the removal device of the nut harvesting apparatus of the invention.

The nut harvesting apparatus of the invention comprises a platform 1 mounted on wheels 2, 3, 4 and 5 (FIG. 1). The wheels 2 and 3 are pivotally mounted to permit directional movement of the platform 1 on its wheels 2, 3, 4 and 5. A plurality of arms 6 are pivotally mounted on the undersurface of the platform 1 (FIGS. 1, 2 and 3). Each of the arms 6 pivotally mounts a corresponding one of a plurality of wheels 7 (FIGS. 1, 2 and 3) for rotation.

Each of the wheels 7 comprises resilient material such as, for example, rubber, and has a deep groove 8 formed in and around its peripheral rim 9. The wheels 7 are mounted in the undersurface of the platform 1 in staggered relation in rows.

A removal device (FIG. 3) removes nuts from the grooves 8 of the wheels 7 and directs them to an assembly area (not shown in the FIGS.) in a truck or on a platform. The removal device comprises an article receiver on trough 11 adjacent each row of wheels 7 (FIG. 3). A plurality of stripping fingers or spaced guide arms 12 (FIG. 3) are mounted on the article receiver 11. Each of the stripping fingers 12 extends into the groove 8 of a corresponding one of the wheels 7, as shown in FIG. 3.

When the platform 1 and the wheels 7 are rolled along the ground they pick up nuts such as, for example, walnuts 13 (FIGS. 2 and 3) from the ground and move them by rotating to the stripping fingers 12. The stripping fingers 12 remove the nuts 13 from the grooves 8 and directs them to an assembly area.

The article receivers 11 may have article conveyors or belts 14 therein to move the nuts 13 against the force of gravity to trucks, carts, cartons, boxes, platforms, or other suitable assembly areas.

While the invention has been described by means of specific examples and in specific embodiments, I do not wish to be limited thereto, for obvious modifications will occur to those skilled in the art without departing from the spirit and scope of the invention.

I claim:

1. Nut harvesting apparatus, comprising
   a platform;
   a plurality of wheels of resilient material each having a deep groove formed in and around its peripheral rim;
   a plurality of arms pivotally mounted on the platform each pivotally mounting a corresponding one of the wheels for rotation; and
   removal means for removing nuts from the grooves of the wheels and directing them to an assembly area whereby when the wheels are rolled along the ground they pick up nuts from the ground and move them by rotating to the removal means which removes the nuts from the grooves and directs them to the assembly area.

2. Nut harvesting apparatus as claimed in claim 1, wherein the wheels are mounted on the platform in staggered relation in rows.

3. Nut harvesting apparatus as claimed in claim 1, wherein the wheels comprise rubber.

4. Nut harvesting apparatus as claimed in claim 1, wherein the platform is mounted on support wheels and has an undersurface and the support wheels comprise rubber and are mounted in staggered relation in rows on the undersurface of the platform.

5. Nut harvesting apparatus as claimed in claim 4, wherein the removal means comprises a trough adjacent each row of wheels and a plurality of stripping fingers mounted in the trough each extending into the groove of a corresponding one of the wheels.

* * * * *